(12) United States Patent
Ye et al.

(10) Patent No.: US 11,366,696 B2
(45) Date of Patent: Jun. 21, 2022

(54) SYSTEM, BOARD CARD AND ELECTRONIC DEVICE FOR DATA ACCELERATED PROCESSING

(71) Applicant: Cambricon Technologies Corporation Limited, Beijing (CN)

(72) Inventors: Kai Ye, Beijing (CN); Ao Wang, Beijing (CN); Jingzi Gu, Beijing (CN); Haolan Peng, Beijing (CN); Kezhong Li, Beijing (CN); Shuai Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 17/108,753

(22) Filed: Dec. 1, 2020

(65) Prior Publication Data
US 2021/0182110 A1 Jun. 17, 2021

(30) Foreign Application Priority Data
Dec. 12, 2019 (CN) .......................... 201911275864.3

(51) Int. Cl.
| | |
|---|---|
| *G06F 9/48* | (2006.01) |
| *G06F 1/20* | (2006.01) |
| *G06F 13/40* | (2006.01) |
| *G06F 9/50* | (2006.01) |

(52) U.S. Cl.
CPC ............ *G06F 9/5027* (2013.01); *G06F 1/206* (2013.01); *G06F 9/4881* (2013.01); *G06F 13/4022* (2013.01); *G06F 2213/0026* (2013.01)

(58) Field of Classification Search
CPC ..... G06F 13/4022; G06F 1/206; G06F 9/5027
See application file for complete search history.

(56) References Cited

U.S. PATENT DOCUMENTS

2016/0134564 A1* 5/2016 Egi ..................... H04L 12/4015
370/401
2021/0048863 A1* 2/2021 Rahardjo ................ G06F 1/189

* cited by examiner

*Primary Examiner* — Zachary K Huson
(74) *Attorney, Agent, or Firm* — Getech Law LLC; Jun Ye (57) ABSTRACT

The present disclosure relates to a system, a computing apparatus, a board card, and an electronic device for data accelerated processing. The computing apparatus may be included in a combined processing apparatus. The combined processing apparatus may also include a universal interconnection interface and other processing apparatuses. The computing apparatus interacts with other processing apparatuses to jointly complete computing operations specified by the user. The combined processing apparatus may also include a storage apparatus which is respectively connected to the computing apparatus and other processing apparatuses and is used for storing data of the computing apparatus and other processing apparatuses. The solution of the present disclosure can be applied to various electronic devices.

15 Claims, 10 Drawing Sheets

SYSTEM, BOARD CARD AND ELECTRONIC DEVICE FOR DATA ACCELERATED PROCESSING

TECHNICAL FIELD

The present disclosure relates to the filed of data processing, and in particular to a system architecture of data processing.

BACKGROUND

A traditional server mainly uses CPU as its computing power provider. CPU, as a general-purpose processor, adopts a serial architecture and is good at logic computations. Since CPU can process and access different types of data, and logic determination requires the introduction of a large amount of branch, jump, and interrupt processing, the internal structure of CPU is often complex. Therefore, the increase in the computing power of CPU is mainly achieved by increasing the number of cores.

With the application of technologies such as cloud computing, big data, artificial intelligence (AI), and the Internet of Things, data has grown exponentially in the past few years. IDC statistics show that 90% of the world's data have been generated in recent years, which poses challenges to the processing capabilities of CPU. The physical technology and numbers of cores of the current CPU are close to the limit, but the growth of data will not stop. In this case, the processing capacity of the server must be improved. Therefore, in the AI era, the traditional server with only CPU as the computing power provider cannot meet demands.

Different from CPU, GPU/TPU/ASIC adopts a parallel computing mode and has more than a thousand cores in a single card. GPU/TPU/ASIC is good at processing intensive computing applications, such as graphics rendering, computing vision, and machine learning. Therefore, in order to solve the problem of insufficient CPU computing power, a common method is to insert a dedicated accelerator card into an extended PCIE slot of CPU. The accelerator card will deal with the large amount of data computing work so that the burden on the CPU can be reduced, thereby significantly improving the performance of the traditional server.

The above approach can improve the computing performance of the traditional server. However, being limited by the number of extended PCIE slots of CPU, when the amount of data processing increases sharply, the approach above may not support the insertion of a sufficient number of accelerator cards and cannot meet the computing power requirements. Moreover, since a plurality of accelerator cards are connected to a PCIE bus of the same CPU, the resources cannot be deployed flexibly.

SUMMARY

Aiming to overcome the defect in the prior art that accelerator cards cannot be used flexibly, the present disclosure provides a technical solution that can deploy computing resources flexibly.

According to a first aspect of the present disclosure, a system for data accelerated processing is provided, which includes: a data exchange unit 100 and an accelerated processing unit 200. The data exchange unit 100 is configured to be communicatively connected to an external host. The accelerated processing unit 200 is configured to be communicatively connected to the data exchange unit 100 to process data from the data exchange unit 100. The accelerated processing unit 200 can be scheduled to meet the needs of different processing capabilities.

According to a second aspect of the present disclosure, a board is provided, which includes the system as described above.

According to a third aspect of the present disclosure, an electronic device is provided, which includes the system or the board card as described above.

The technical solution of the present disclosure can ensure that there are sufficient computing resources to meet the requirements of computing power. Moreover, the technical solution only needs to occupy one PCIE slot of a traditional server, which may overcome the problem of limited PCIE slots of a traditional server.

BRIEF DESCRIPTION OF THE DRAWINGS

The following detailed description with reference to the accompanying drawings will make the above-mentioned and other objects, features and technical effects of the exemplary embodiments of the present disclosure easier to understand. In the accompanying drawings, several embodiments of the present disclosure are shown in an exemplary but not restrictive manner, and the same or corresponding reference numerals indicate the same or corresponding parts of the embodiments.

DETAILED DESCRIPTION

Technical solutions in embodiments of the present disclosure will be described clearly and completely hereinafter with reference to the drawings in the embodiments of the present disclosure. Obviously, the embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" appear in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context. Similarly, depending on the context, the phrase "if it is determined that" or "if [a described condition or event] is detected" can be interpreted as "once it is determined that", or "in response to a determination", or "once [a described condition or event] is detected", or "in response to a case where [a described condition or event] is detected".

Figure 1:
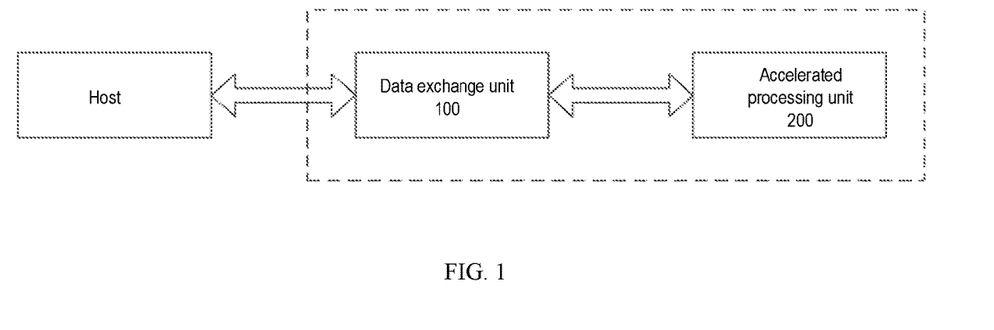
FIG. 1 is a schematic block diagram of a system for accelerated data processing according to an embodiment of the present disclosure.

FIG. 1 is a block diagram of a system for data accelerated processing according to an embodiment of the present disclosure.

As shown in FIG. 1, the system for data accelerated processing provided by the present disclosure includes: a data exchange unit 100 and an accelerated processing unit 200. The data exchange unit 100 is configured to be communicatively connected to an external host. The accelerated processing unit 200 is configured to be communicatively connected to the data exchange unit 100 to process data from the data exchange unit 100. The acceleration processing unit 200 can be scheduled to meet the needs of different processing capabilities.

A composition and a structure of the system of the present disclosure is shown schematically in the dash line box of FIG. 1. The data exchange unit can be connected to the host in a variety of ways such as a cable or a plug-in card. After receiving data or an instruction from the host, the data exchange unit forwards the data or the instruction to the accelerated processing unit 200. The data or the instruction is processed in the accelerated processing unit 200, thereby improving the processing capability of the host. In addition, in the present disclosure, the host can schedule an appropriate count of the accelerated processing units 200 through the data exchange unit 100, so that different computing power requirements can be met.

In FIG. 1, the data exchange unit 100 and the accelerated processing unit 200 can be on the same device or motherboard, or on different devices, or on different motherboards. Therefore, the dash line is used to indicate the selectable relationship between the data exchange unit and the accelerated processing unit.

In addition, the term "communicatively connected" mentioned in the above means that two components may be in a connected state through, for example, a cable or a slot, and this connection may or may not be in a communication state.

The host can be a traditional X86 server, which is a controller and service object of the whole machine. When there is a large amount of data to be calculated, the host needs the support of additional computing power.

According to an embodiment of the present disclosure, the data exchange unit 100 may include a PCIE switch. The PCIE switch in the drawings generally refers to all devices that use a PCIE bus for communication, such as the common used hard disk and InfiniBand Card (unlimited bandwidth network card).

The PCI-Express serial standard has been more and more widely used in the computer industry as a high-speed connection between chip and chip, system and plug-in card, and system and system. The PCIE switch is used to interconnect PCIE devices. The communication protocol between the PCIE switch chip and other devices is PCIE.

Hereinafter, various connection relationships between the PCIE switch and the accelerated processing unit 200 will be described in conjunction with a plurality of drawings.

Figure 2:
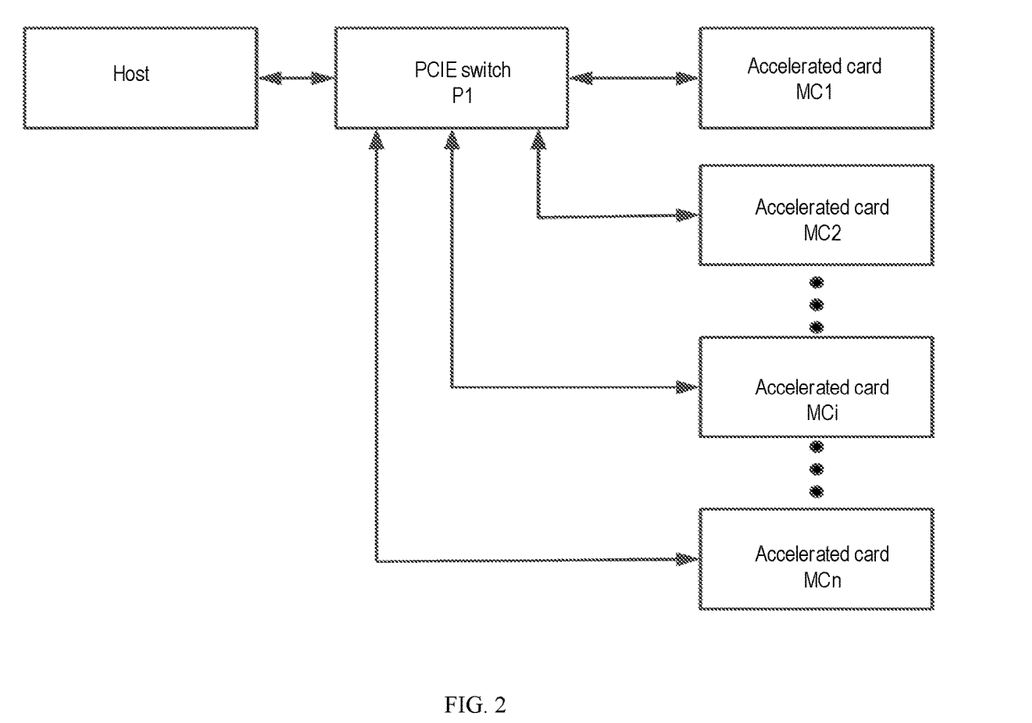
FIG. 2 is a schematic block diagram of a system for accelerated data processing according to an embodiment of the present disclosure.

FIG. 2 shows a schematic block diagram of a system for data accelerated processing according to an embodiment of the present disclosure.

As shown in FIG. 2, the data exchange unit 100 may include a single PCIE switch P1 which is configured to be communicatively connected with a single external host. The accelerated processing unit 200 includes one or more accelerator cards MC1, MC2, . . . , MCi, . . . , MCn. Each of the one or more accelerator cards MC1, MC2, . . . , MCi, . . . , MCn is communicatively connected to the single PCIE switch P1 to process data from the single PCIE switch P1.

Each of the accelerator card shown in the present disclosure may be a mezzanine card, which is a single separated circuit board (MC for short). MC carries an ASIC chip and some necessary peripheral control circuits, and is connected to the baseboard through a mezzanine connector. Power and control signals on the baseboard are transferred to MC through the mezzanine connector.

ASIC is an application specific integrated circuit. It refers to an integrated circuit designed and manufactured to comply with specific user requirements and specific electronic system demands. A feature of ASIC is that it is oriented to the needs of specific users. In mass production, compared with general integrated circuits, ASIC has technical effects of smaller size, lower power consumption, improved reliability, better performance, enhanced confidentiality, and lower cost.

In FIG. 2, a plurality of accelerator cards MC are connected to the PCIE switch P1. When the host needs additional computing power, the host may schedule more accelerator cards through the PCIE switch. When the computing power demand drops, some accelerator cards may be released.

Figure 3:
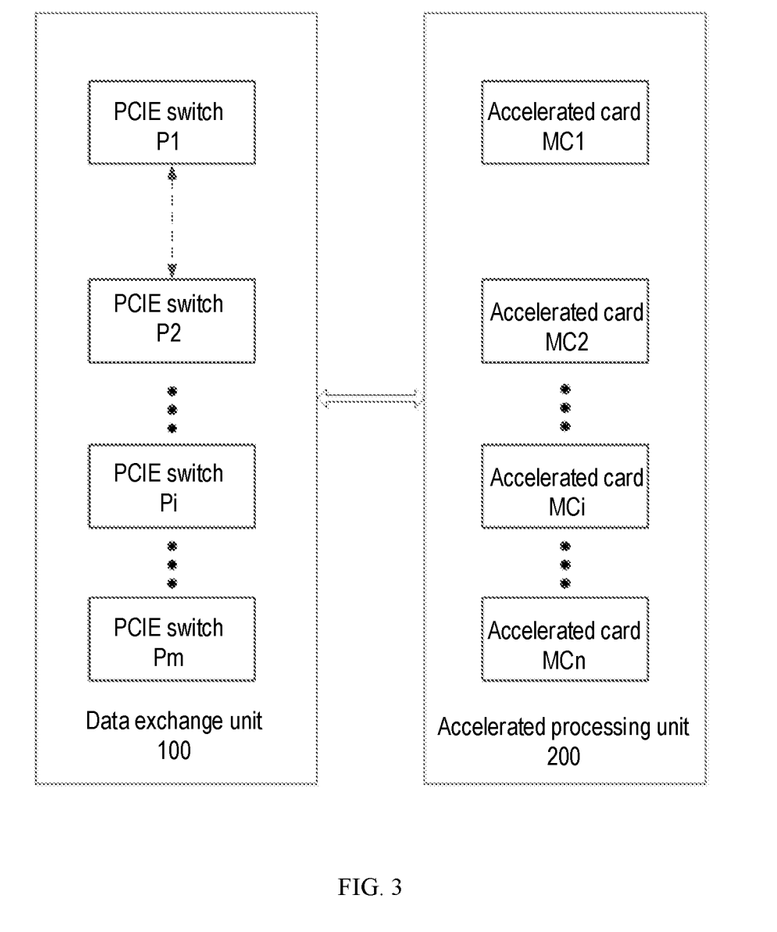
FIG. 3 is a schematic block diagram of a system for accelerated data processing according to an embodiment of the present disclosure.

FIG. 3 shows a schematic block diagram of a system for data accelerated processing according to an embodiment of the present disclosure.

As shown in FIG. 3, the data exchange unit 100 may include a plurality of PCIE switches P1, P2, ..., Pi, ..., Pm, each of which is configured to be communicatively connected with the external host.

The accelerated processing unit 200 includes a plurality of accelerator cards MC1, MC2, ..., MCi, ..., MCn. The plurality of accelerator cards MC1, MC2, ..., MCi, MCn and the plurality of PCIE switches P1, P2, ..., Pi, ..., Pm are communicatively connected to process data from the plurality of PCIE switches P1, P2, ..., Pi, ..., Pm.

In this embodiment, when not being restricted by a count of interfaces, a count of PCIE switches can be any number, and a count of accelerator cards can also be any number. A plurality of hosts can also be included. In other words, each host can be connected to one or more PCIE switches, and each PCIE switch can be connected to one or more accelerator cards. This will be described in more detail later. Each host can schedule a corresponding accelerator card through a PCIE switch connected to the host.

Figure 4:
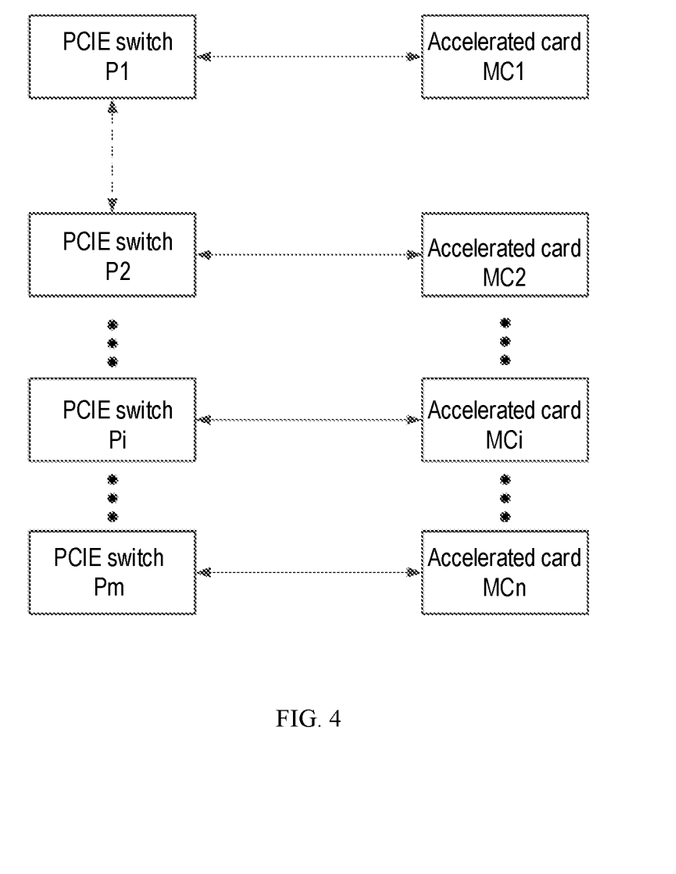
FIG. 4 is a schematic block diagram of a system for accelerated data processing according to an embodiment of the present disclosure.

FIG. 4 shows a schematic block diagram of a system for data accelerated processing according to an embodiment of the present disclosure.

As shown in FIG. 4, the count m of the plurality of PCIE switches P1, P2, ..., Pi, ..., Pm is equal to the count n of the plurality of accelerator cards MC1, MC2, ..., MCi, ..., MCn, so that each of the PCIE switches can be communicatively connected to an accelerator card.

In FIG. 4, each accelerator card is connected to a corresponding PCIE switch. For example, the accelerator card MC1 is connected to the PCIE switch P1, the accelerator card MC2 is connected to the PCIE switch P2, the accelerator card MCi is connected to the PCIE switch Pi, and the accelerator card MCn is connected to the PCIE switch Pn. In this case, one host can be connected to one PCIE switch (that is, a count of hosts is the same as the count of PCIE switches), or one host can be connected to a plurality of PCIE switches (that is, the count of hosts is less than the count of PCIE switches). In this way, when a host needs to adjust the computing power, the host can use a PCIE switch to schedule an accelerator card that is connected to the PCIE switch to increase or release the computing power.

Figure 5:
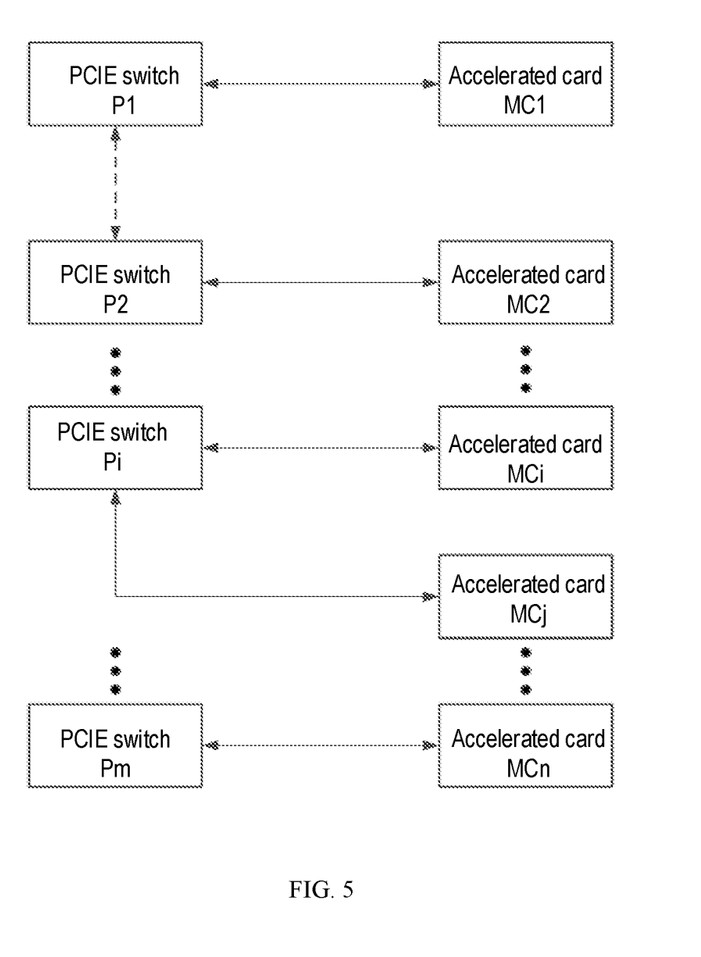
FIG. 5 is a schematic block diagram of a system for accelerated data processing according to an embodiment of the present disclosure.

FIG. 5 shows a schematic block diagram of a system for data accelerated processing according to an embodiment of the present disclosure.

As shown in FIG. 5, the count m of the plurality of PCIE switches P1, P2, ..., Pi, ..., Pm is less than the count n of the plurality of accelerator cards MC1, MC2, ..., MCi, ..., MCn, so that at least one of the plurality of the PCIE switches P1, P2, ..., Pi, ..., Pm can be communicatively connected to at least two of the accelerator cards MC1, MC2, ..., MCi, ..., MCn.

In FIG. 5, the accelerator card MC1 is connected to the PCIE switch P1, the accelerator card MC2 is connected to the PCIE switch P2, the accelerator cards MCi and MCj are both connected to the PCIE switch Pi, and the accelerator card MCn is connected to the PCIE switch Pn. In this case, one host can be connected to one PCIE switch (that is, the count of hosts is the same as the count of PCIE switches), or one host can be connected to a plurality of PCIE switches (that is, the count of hosts is less than the count of PCIE switches). In this way, when each host needs to adjust the computing power, the host can use a PCIE switch to schedule an accelerator card that is connected to the PCIE switch to increase or release the computing power.

It should be understood that though as an example, FIG. 5 shows that the PCIE switch Pi is connected to the accelerator cards MCi and MCj, yet any one of the PCIE switches P1-Pn can be connected to a plurality of accelerator cards whose count is dependent on a count of available ports of the PCIE switch. On the other hand, the ports of the PCIE switch can also be expanded by using the interface expansion device, so that more accelerator cards can be connected without being limited by the count of ports of the PCIE switch.

It should be pointed out that the PCIE switches can be independent of each other, or, according to an embodiment of the present disclosure, the plurality of PCIE switches P1, P2, ..., Pi, ..., Pm can be connected, so that each of the PCIE switches can share an accelerator card connected to itself with the other PCIE switches.

In the schematic diagrams shown in FIG. 3 to FIG. 5, the connections between the PCIE switches are shown by dash lines, indicating that the PCIE switches may be communicatively connected or may not be connected. Through the connection between PCIE switches, the accelerator cards connected to the PCIE switches can be scheduled more flexibly. For example, as shown in FIG. 4, when the PCIE switch P1 is connected to the PCIE switch P2, the host connected to the PCIE switch P1 can not only use the accelerator card MC1, but can also schedule the accelerator card MC2 through the PCIE switch P2. In this case, when the host connected to the PCIE switch P1 needs additional computing power, the host can schedule the accelerator card MC2 additionally through the PCIE switch P2. Further, when these PCIE switches are all connected, a plurality of hosts can schedule the connected accelerator cards through the PCIE switches according to their respective computing power requirements, thereby achieving a balance of computing power requirements of the hosts.

A connection mode of the PCIE switch will be described in detail below with reference to the drawings.

Figure 6:
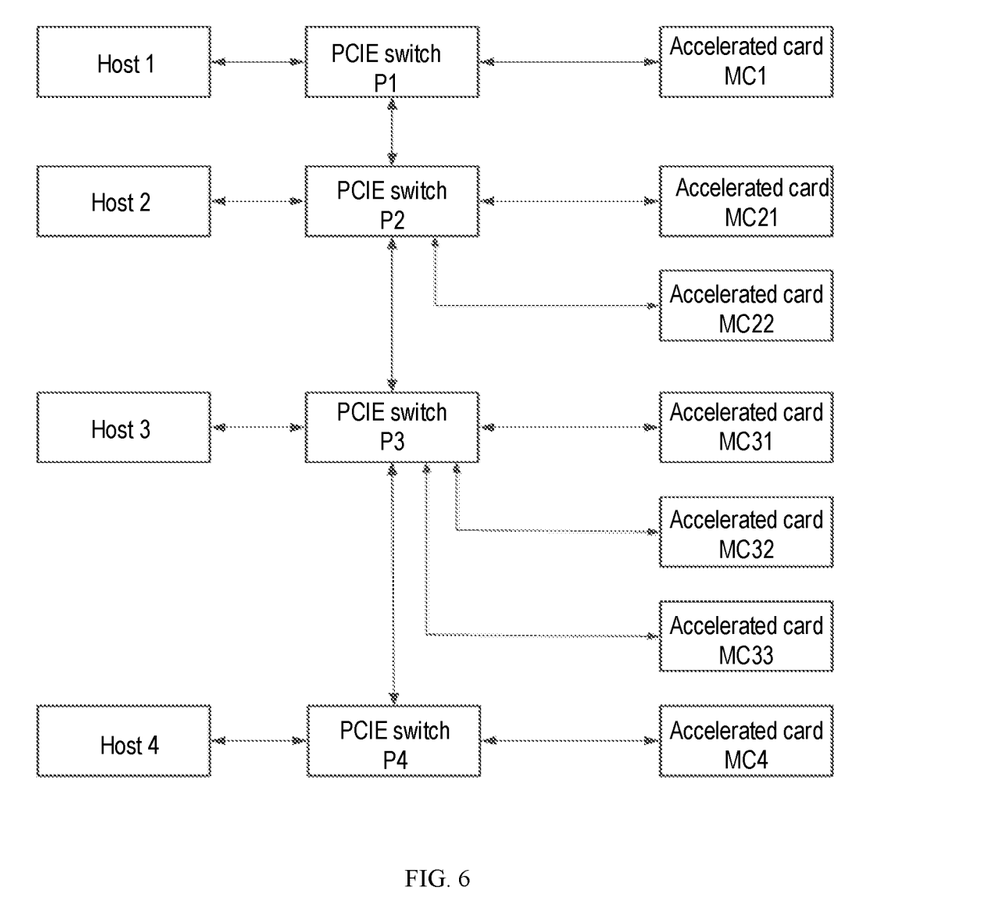
FIG. 6 is a schematic diagram showing PCIE switches connected in cascade according to an embodiment of the present disclosure.

FIG. 6 is a schematic diagram showing PCIE switches connected in cascade according to an embodiment of the present disclosure.

For a clear description, FIG. 6 exemplarily shows four PCIE switches P1-P4. As shown in FIG. 6, according to an embodiment of the present disclosure, the plurality of PCIE switches are connected in cascade. In other words, the PCIE switch P1 is connected to the PCIE switch P2, the PCIE switch P2 is connected to the PCIE switch P3, and the PCIE switch P3 is connected to the PCIE switch P4.

Further, as shown in FIG. 6, the PCIE switch P1 is connected to one accelerator card MC1; the PCIE switch P2 is connected to two accelerator cards MC21 and MC22; the PCIE switch P3 is connected to three accelerator cards MC31, MC32 and MC33; and the PCIE switch P4 is connected to one accelerator card MC4.

In addition, there may be only one PCIE switch that is connected to a host, then the PCIE switch is connected to other PCIE switches. Alternatively, each PCIE switch may be connected to a host, which is as shown in FIG. 6 that the PCIE switch P1 is connected to the host 1, the PCIE switch P2 is connected to the host 2, the PCIE switch P3 is connected to the host 3, and the PCIE switch P4 is connected to the host 4.

In the situation shown in FIG. 6, the host 1 can use the accelerator card MC1 through the PCIE switch P1. When the computing power of the accelerator card MC1 cannot meet the requirements of the host 1, the host 1 can use the PCIE switch P1 to communicate with the PCIE switch P2 to schedule the computing power of the accelerator card MC21 and/or MC22 connected to the PCIE switch P2. Further, the host 1 can also use the PCIE switch P3 to schedule the computing power of the accelerator card MC31, MC32, and/or MC33. Similarly, the host 2, the host 3, and the host 4 can also schedule the accelerator cards connected to other PCIE switches, which will not be repeated herein.

It can be seen from FIG. 6 that each host can schedule a different accelerator card through a PCIE switch as needed to meet its computing power requirements.

In addition, in FIG. 6, though the PCIE switches are connected to each other by a single line, in order to improve the reliability of communication between the PCIE switches, those skilled in the art can also connect the PCIE switches with two or more communication lines to build a reliable communication backup. Once one of the communication lines fails, another line can be used for communication, which increases the reliability and maintainability of the system.

Figure 7:
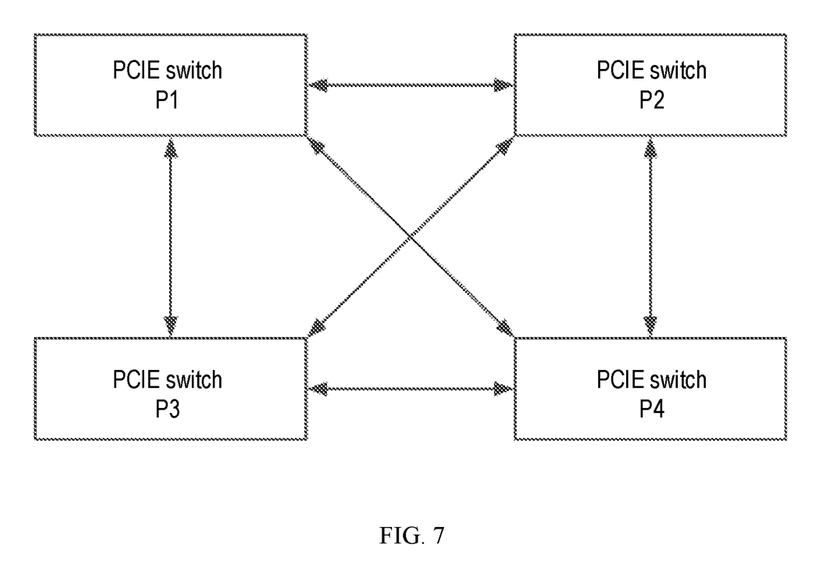
FIG. 7 is a schematic diagram showing PCIE switches being connected in pairs according to an embodiment of the present disclosure.

FIG. 7 is a schematic diagram showing PCIE switches being connected in pairs according to an embodiment of the present disclosure.

In FIG. 7, for convenience, four PCIE switches are shown, but those skilled in the art can understand that there may also be more or fewer PCIE switches.

As shown in FIG. 7, the PCIE switch P1 is connected to the PCIE switch P2, the PCIE switch P3, and the PCIE switch P4 respectively. In addition to the PCIE switch P1, the PCIE switch P2 is also connected to the PCIE switch P3 and the PCIE switch P4. In addition to the PCIE switch P1 and the PCIE switch P2, the PCIE switch P3 is also connected to the PCIE switch P4. In other words, each PCIE switch is connected to other PCIE switches. This connection method has relatively high reliability. When some PCIE switches fail, the normal functioning of other PCIE switches will not be affected, nor will it affect the communication between other PCIE switches.

It should be understood that in FIG. 7, though the host and the accelerator card MC are not shown, yet as shown in FIG. 1 to FIG. 6, every PCIE switch can be connected to the host, or only one PCIE switch can be connected to one host, where each PCIE switch can be connected to one or more accelerator cards. For brevity and clarity, the connection is not shown here.

Figure 8A:
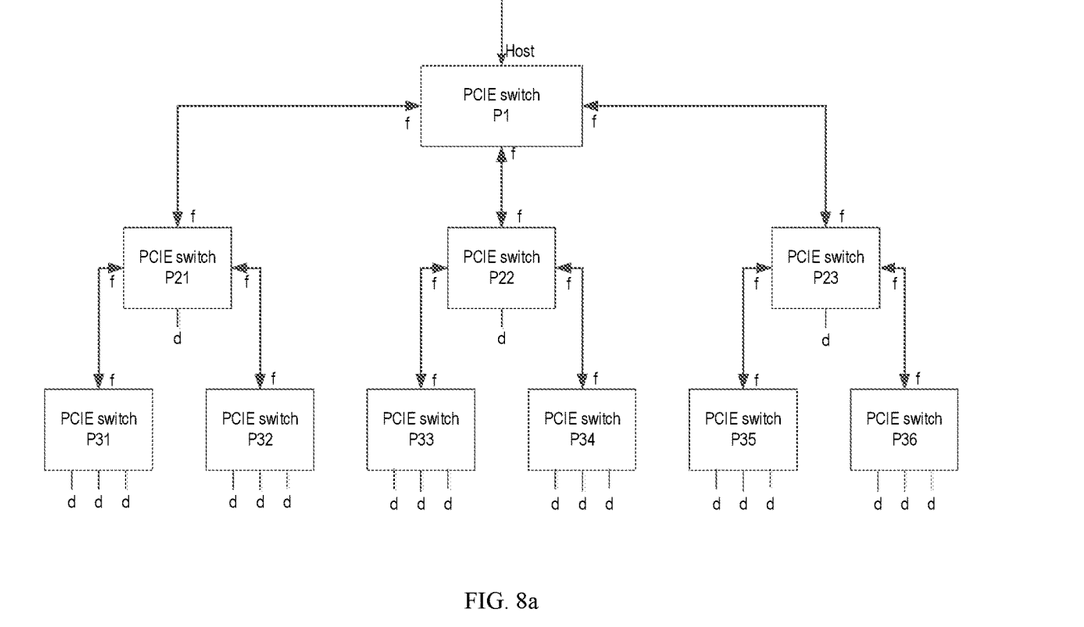
FIG. 8a is a schematic diagram showing a plurality of PCIE switches being connected in a tree topology manner according to an embodiment of the present disclosure.

FIG. 8a is a schematic diagram showing a plurality of PCIE switches being connected in a tree topology manner according to an embodiment of the present disclosure As shown in FIG. 8a, there may be a plurality of levels of PCIE switches (FIG. 8a shows three levels as an example). A first level includes the PCIE switch P1; a second level includes the PCIE switch P21, the PCIE switch P22, and the PCIE Switch P23; a third level includes the PCIE switch P31, the PCIE switch P32, the PCIE switch P33, the PCIE switch P34, the PCIE switch P35, and the PCIE switch P36. In FIG. 8a, the PCIE switch of each level can be connected to one or more PCIE switches of a lower level, thus forming a tree structure.

Specifically, in FIG. 8a, the PCIE switch P1 is connected to the PCIE switch P21, the PCIE switch P22, and the PCIE switch P23. In the second level, the PCIE switch P2 is connected to the PCIE switch P31 and the PCIE switch P32; the PCIE switch P22 is connected to the PCIE switch P33 and the PCIE switch P34; the PCIE switch P23 is connected to the PCIE switch P35 and the PCIE switch P36.

In this tree topology, the PCIE switch P1 in the first level can connect to the host through a "Host" port, connect to other PCIE switches through an "f" port, and connect to an accelerator card through a "d" port. The PCIE switches P21, P22, and P23 in the second level can be connected to the upper-level PCIE switch P1 through the "f" ports, can be connected to the lower-level PCIE switch P31-P36 through the "f" ports, and can be connected to accelerator cards through the "d" ports. The PCIE switches P31-P36 at the third level can also be designed similarly.

Therefore, the host can configure each PCIE switch through the PCIE switch P1 at the first level and can deploy the resources of another PCIE switch. In other words, the host can schedule the accelerator card connected to any lower-level PCIE switch through an upper-level PCIE switch. For example, the host can schedule any accelerator card connected to the PCIE switches P21-P23 at the second level through the PCIE switch P1, or can further schedule any accelerator card connected to the PCEI switches P31-P36 at the third level, thereby realizing flexible resource deployment.

The tree topology shown in FIG. 8a may help to reduce the count of ports required by the PCIE switches, and facilitate the resource allocation among the PCIE switches.

Figure 8B:
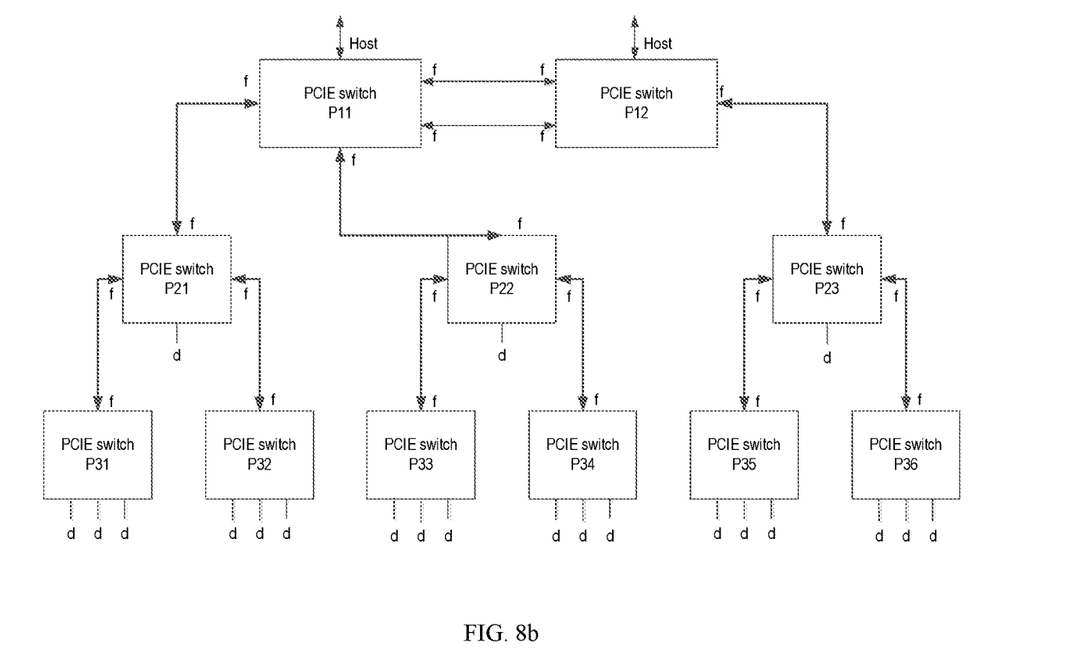
FIG. 8b is a schematic diagram showing a plurality of PCIE switches being connected in a double-tree topology manner according to an embodiment of the present disclosure.

FIG. 8b is a schematic diagram showing a plurality of PCIE switches being connected in a double-tree topology manner according to an embodiment of the present disclosure.

FIG. 8b shows a topology similar to that of FIG. 8a. A difference between them is that the double-tree topology of FIG. 8b includes two (the present disclosure does not limit the count to two, the topology may include any number of PCIE switches) PCIE switches P11 and P12 at the first level as an example. The two PCIE switches P11 and P12 at the first level are connected through two lines. The first-level PCIE switch P11 can be further connected to PCIE switches P21 and P22 at a next level, and the first-level PCIE switch P12 can be connected to the PCIE switch P23 at the next level. The connection of the PCIE switches P21, P22, and P23 at the second level to the PCIE switches at a third level is similar to that in FIG. 8a, which will not be repeated herein. In the structure shown in FIG. 8b, any host can schedule a PCIE switch at the first level that is connected to the host, and can also schedule another PCIE switch at the first level, or can schedule any other PCIE switch at the second or third level through another PCIE switch switch at the first level. Further, the double-tree topology shown in the structure of in FIG. 8b contributes to a reliable backup and may improve system stability as well as reduce the possibility of affecting the overall work quality due to a line failure.

In addition, though not shown in the drawing, it should be understood that a PCIE switch at the first level can also be connected to an accelerator card through a d port.

Figure 9:
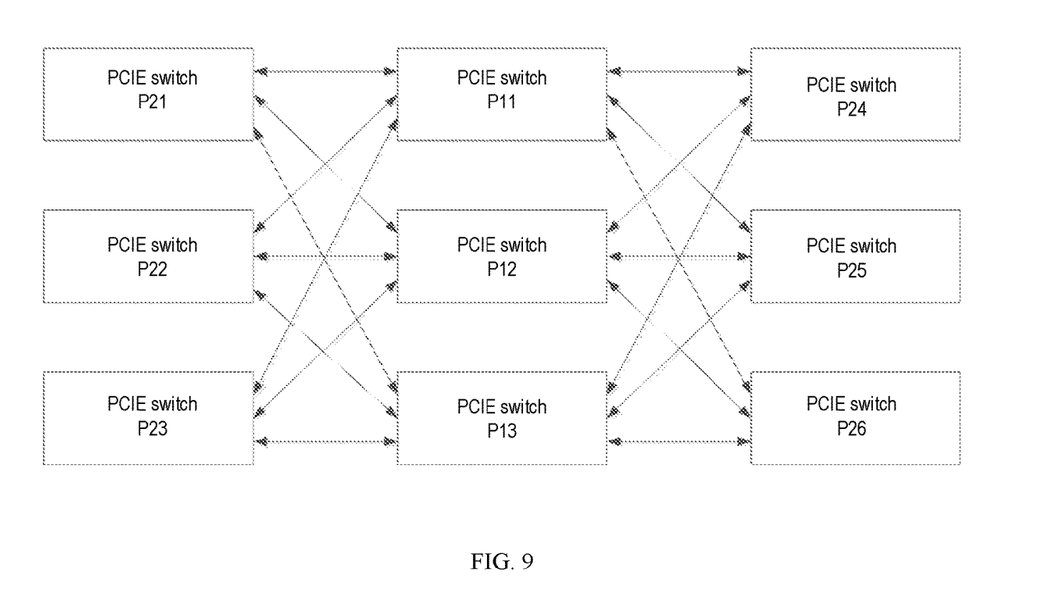
FIG. 9 is a schematic diagram showing a plurality of PCIE switches being connected in a fat-tree topology manner according to an embodiment of the present disclosure.

FIG. 9 is a schematic diagram showing a plurality of PCIE switches being connected in a fat-tree topology manner according to an embodiment of the present disclosure.

As shown in FIG. 9, 9 PCIE switches are shown as an example. The 9 PCIE switches are divided into a first level of PCIE switches including P11, P12, and P13; and a second level of PCIE switches including P21, P22, P23, P24, P25, and P26. It should be understood that the division of the first and second levels of PCIE switch does not mean that any level is higher than the other level, but aims to facilitate the functional distinction between the two.

In FIG. 9, the PCIE switch P21 at the second level can be communicatively connected to the PCIE switches P11, P12, and P13 at the first level respectively. The PCIE switch P22 at the second level can be communicatively connected to the PCIE switches P11, P12, and P13 at the first level respectively. The PCIE switch P23 at the second level can be communicatively connected to the PCIE switches P11, P12 and P13 at the first level respectively.

Further, in FIG. 9, the PCIE switch P24 at the second level can be communicatively connected to the PCIE switches P11, P12, and P13 at the first level respectively. The PCIE switch P25 at the second level can be communicatively connected to the PCIE switches P11, P12, and P13 at the first level respectively. The PCIE switch P26 at the second level can be communicatively connected to the PCIE switches P11, P12 and P13 at the first level respectively.

In the fat-tree topology shown in FIG. 9, each of the PCIE switches P11, P12, and P13 at the first level can configure a lookup table D-LUT of the PCIE switches P21, P22, P23, P24, P25, and P26, so as to determine a communication path between the switches at the second level.

More specifically, for example, the PCIE switches at the first level can form the following communication path:

P21<------>P11<------>P24
P21<------>P11<------>P25
P21<------>P11<------>P26
P21<------>P11<------>P22
P21<------>P11<------>P23
P22<------>P12<------>P24
P22<------>P12<------>P25
P22<------>P12<------>P26
P22<------>P12<------>P21
P22<------>P12<------>P23
P23<------>P13<------>P24
P23<------>P13<------>P25
P23<------>P13<------>P26
P23<------>P13<------>P21
P23<------>P13<------>P22

It should be understood that the count of PCIE switches above is only an example, and those skilled in the art can use any other count of PCIE switches.

Similarly, it should be understood that in FIG. 9, though the host and the accelerator card MC are not shown, yet as shown in FIG. 1 to FIG. 6, every PCIE switch can be connected to the host, or only one PCIE switch can be connected to one host, where each PCIE switch can be connected to one or more accelerator cards. For brevity and clarity, the connection is not shown here.

In the description of FIGS. 3-9, the connection between the PCIE switches can be realized by a single communication line or a plurality of communication lines (similar to the situation shown in FIG. 8*b*), thereby increasing the redundancy and backup of PCIE switching as well as improving the system reliability.

Figure 10:
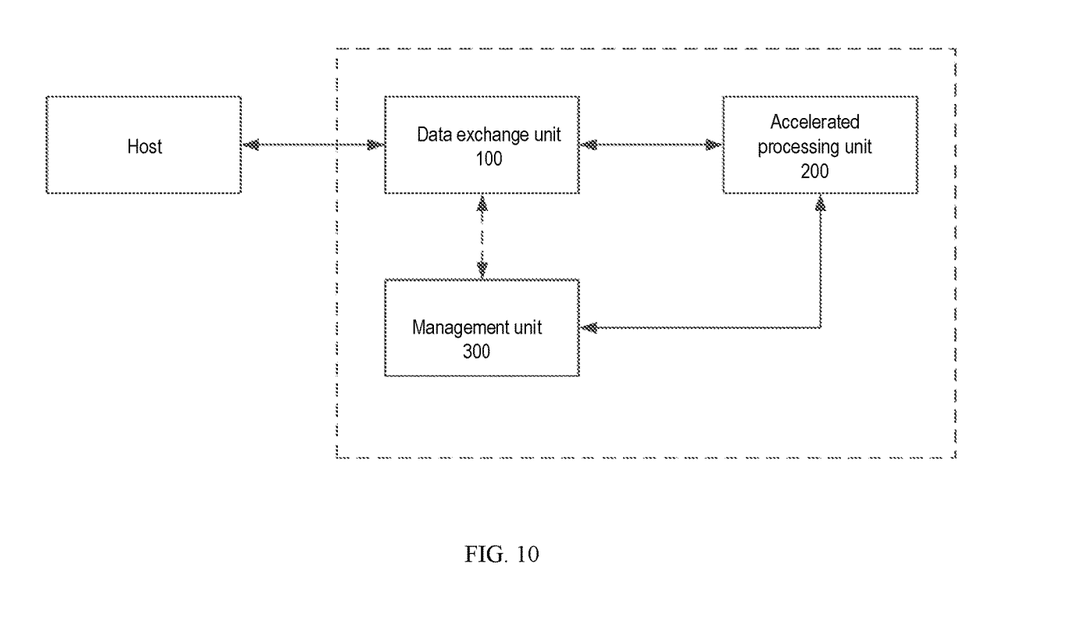
FIG. 10 is another exemplary block diagram of a system for data accelerated processing according to another embodiment of the present disclosure.

FIG. 10 is another exemplary block diagram of a system for data accelerated processing according to another embodiment of the present disclosure.

As shown in FIG. 10, the system further includes a management unit 300 configured to manage the data exchange unit 100 and/or the accelerated processing unit 200.

The management unit 300 may be a baseboard management controller BMC. BMC is responsible for the management of the entire chassis. Functions of BMC include monitoring power supplies, fans, PCIE devices, and/or accelerator card MC, and reporting faults to the host in time. At the same time, BMC is responsible for receiving and processing the temperature information of various places of the entire machine collected by the temperature sensor, and the current and voltage of the key components of the whole board collected by the power sensor. If the temperature and power consumption are abnormal, the alarm mechanism will be triggered.

The management unit 300, such as BMC, may be connected to the accelerated processing unit 200, or may also be connected to the data exchange unit 100. When the data exchange unit 100 includes a plurality of PCIE switches, the management unit may be connected to one of the PCIE switches, or may be connected to the plurality of PCIE switches. It should be understood that the connection described above may be direct connection, or indirect connection via other intermediate devices. The connection method can be any appropriate interface.

Figure 11:
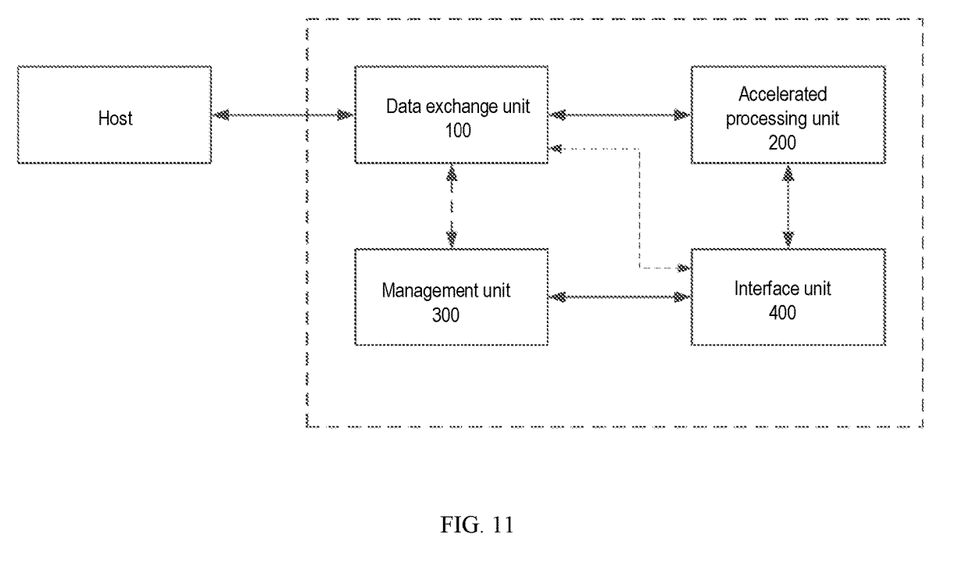
FIG. 11 is another exemplary block diagram of a system for data accelerated processing according to another embodiment of the present disclosure.

FIG. 11 is another exemplary block diagram of a system for data accelerated processing according to another embodiment of the present disclosure.

As shown in FIG. 11, the system of the present disclosure further includes an interface unit 400 configured to be connected to the management unit 300 so as to manage the data exchange unit 100 and/or the accelerated processing unit 200.

The interface unit 400 may be a micro-control unit MCU. MCU integrates the CPU, RAM, ROM, timer counter, and various I/O interfaces of a computer on a chip to form a chip-level computer, which is mostly used for the control of electronic products.

The micro-control unit MCU can be connected to the management unit 300, and the management unit 300 manages the accelerated processing unit through the micro-control unit MCU. The micro-control unit MCU can also be connected to the data exchange unit 100. Similarly, when the data exchange unit 100 includes a plurality of PCIE switches, the micro-control unit MCU can be connected to one or more of the PCIE switches.

Figure 12:
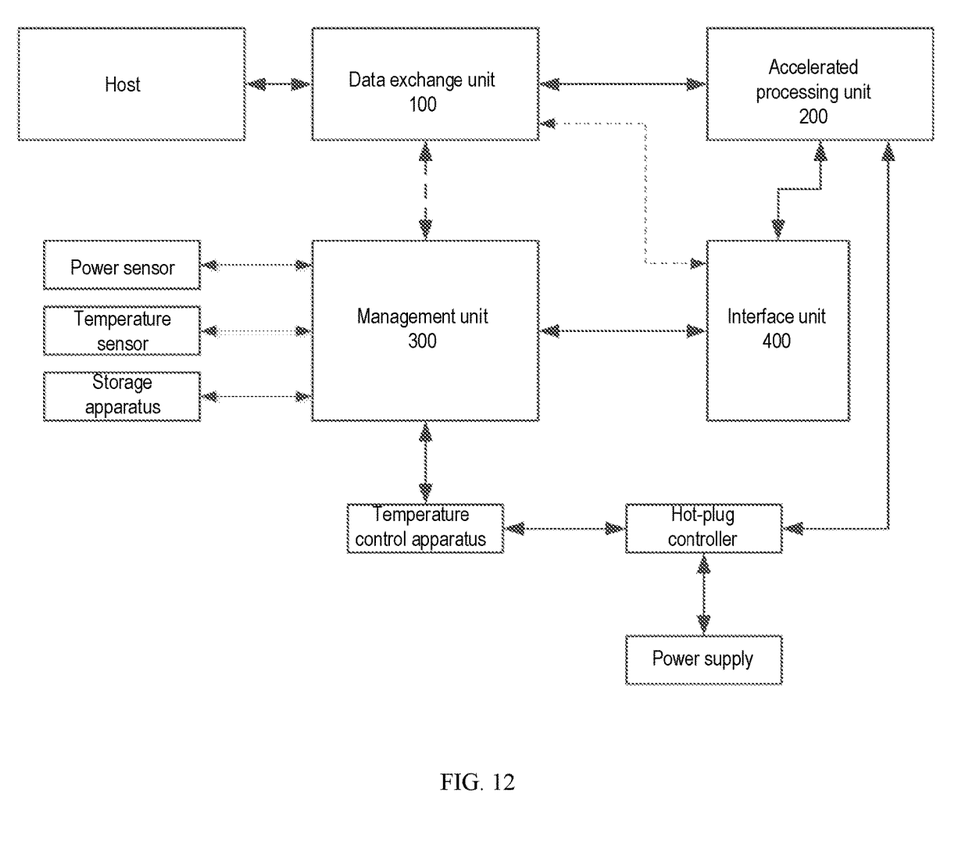
FIG. 12 is a schematic block diagram of a system according to a further embodiment of the present disclosure.

FIG. 12 is a schematic block diagram of a system according to a further embodiment of the present disclosure.

As shown in FIG. 12, the system of the present disclosure further includes: a sensing apparatus connected to the management unit 300 to interact with the management unit 300 for sensing information; a storage apparatus connected to the management unit 300 to facilitate data access by the management unit 300; and/or a temperature control apparatus connected to the management unit 300 to facilitate temperature regulation of the system by the management unit 300.

In FIG. 12, the sensing apparatus may include various types of sensors, such as a power sensor, a temperature sensor, etc. The management unit 300 may receive signals from these sensors. The power sensor collects current and voltage data of key components on the board, such as an MC card, a temperature control apparatus (such as a fan), and a hard disk, and reports the current and voltage data to BMC and MCU for determination and processing through an I2C bus. The temperature sensor is placed in various places on the baseboard and is configured to collect the temperature of high power consumption components such as a power conversion chip and report the temperature to BMC and MCU for determination and processing. If the temperature is too high, an alarm mechanism will be triggered.

The storage apparatus may also be any appropriate type of memory. For example, the storage apparatus may include a storage media such as a DDR, a Flash, and an SD card for storing firmware and log information.

The temperature control apparatus can be a fan or any other component that can control the temperature of the management unit. The temperature control apparatus can be connected to the power supply through a hot-plug controller. The function of the hot-plug controller is to provide a hot-plug function and a power monitoring function. The so-called hot plug means that the power interface can be plugged and unplugged when the power is on. For example, when a fan fails, the fan can be removed and a new fan can be added without powering down the baseboard. When the accelerated processing unit 200 includes a plurality of MC cards, the hot-plug controller may be connected to one or more MC cards.

The various topologies of the present disclosure can be expanded and deformed indefinitely to ensure that there are enough MC cards to meet the requirements of computing power. Moreover, the technical solution only needs to occupy one PCIE slot of a traditional server, which may overcome the problem of limited PCIE slots of a traditional server.

The count of MC cards connected to the PCIE bus of each server (host) can be flexibly configured through software to dynamically adjust computing resources so as to ensure that each server can achieve optimal performance and overcome the problem that the resources cannot be flexibly deployed when a plurality of accelerator cards are connected to the PCIE bus of the same CPU in a traditional server.

The system of the present disclosure may also be implemented on a board card, or in an electronic device or an electronic apparatus such as a server.

Figure 13:
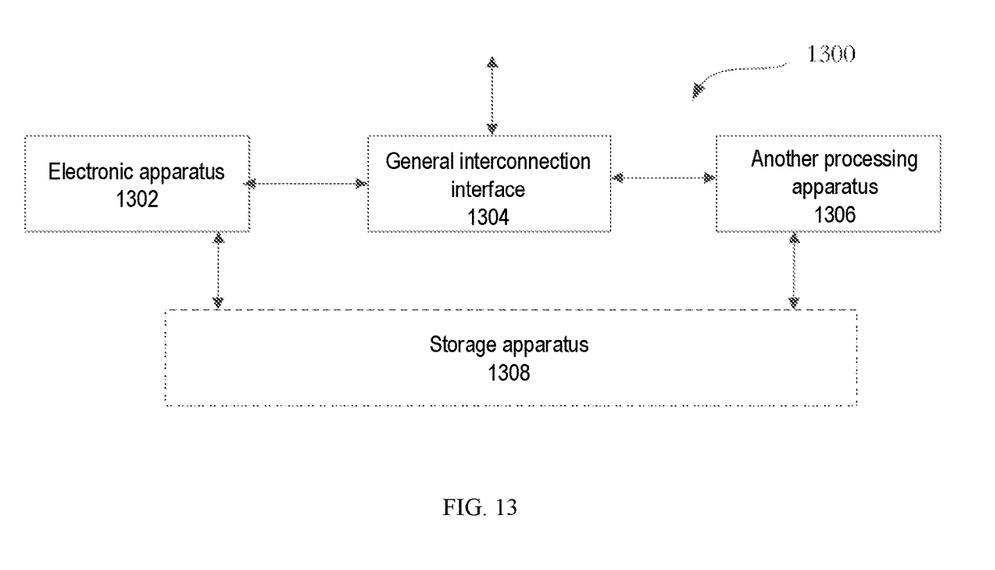
FIG. 13 is a schematic diagram of a combined processing apparatus.

The present disclosure also provides a combined processing apparatus 1300 which includes the above-mentioned electronic apparatus 1302, a general interconnection interface 1304, and another processing device 1306. The electronic apparatus interacts with other processing apparatus to jointly complete computing operations specified by the user. FIG. 13 is a schematic diagram of the combined processing apparatus.

Another processing apparatus includes one or more types of general-purpose/special-purpose processors such as a central processing unit (CPU), a graphics processing unit (GPU), a neural network processor, and the like. The present disclosure does not restrict a count of processors included in another processing apparatus. Another processing apparatus can serve as an interface that connects a machine learning operation apparatus to external data and control including data moving, and can perform the basic control such as starting and stopping the machine learning operation apparatus. Another processing apparatus may also cooperate with the machine learning operation apparatus to complete computation tasks.

The general interconnection interface is configured to transfer data and a control instruction between the electronic apparatus and another processing apparatus. The electronic apparatus is configured to obtain required input data from another processing apparatus and write the data in an on-chip storage apparatus of the electronic apparatus. The electronic apparatus may obtain a control instruction from another processing apparatus, and write the control instruction in an on-chip control cache of the electronic apparatus. The electronic apparatus may further read data stored in a storage module of the electronic apparatus and transfer the data to another processing appartus.

Alternatively, the structure may also include a storage apparatus 1308. The storage apparatus is connected to the electronic apparatus and another processing apparatus respectively. The storage apparatus is configured to store data of the electronic apparatus and another processing apparatus. The storage apparatus may be particularly suitable when data to be computed cannot be entirely stored in an internal memory of the electronic apparatus or another processing apparatus.

The combined processing apparatus can be used as an SOC (System On Chip) of a device including a mobile phone, a robot, a drone, a video surveillance device, and the like, which may effectively reduce the core area of a control component, increase the processing speed, and reduce the overall power consumption. In this case, the general interconnection interface of the combined processing apparatus may be connected to some components of the device. The some components include, for example, a webcam, a monitor, a mouse, a keyboard, a network card, and a WIFI interface.

In some embodiments of the present disclosure, an electronic device is provided, which includes the electronic apparatus.

The electronic device or apparatus includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

The foregoing can be better understood according to the following articles:

Article 1. A system for data accelerated processing, comprising: a data exchange unit (100) and an accelerated processing unit (200), wherein, the data exchange unit (100) is configured to be communicatively connected to an external host;

the accelerated processing unit (200) is configured to be communicatively connected to the data exchange unit (100) to process data from the data exchange unit (100), wherein, the accelerated processing unit (200) is configured to be scheduled to meet the needs of different processing capabilities.

Article 2. The system of Article 1, wherein, the data exchange unit (100) includes a PCIE switch.

Article 3. The system of Article 1 or 2, wherein, the data exchange unit (100) includes a single PCIE switch (P1) configured to be communicatively connected to a single external host, the accelerated processing unit (200) includes one or more accelerator cards (MC1, MC2, . . . , MCi, . . . , MCn), wherein, each of the one or more accelerator cards (MC1, MC2, MCi, MCn) is communicatively connected to the single PCIE switch (P1) to process data from the single PCIE switch (P1).

Article 4. The system of any of Articles 1-3, wherein, the data exchange unit (100) includes a plurality of PCIE switches (P1, P2, . . . , Pi, . . . , Pm), each of which is configured to be communicatively connected to the external host, and the accelerated processing unit (200) includes a plurality of accelerator cards (MC1, MC2, . . . , MCi, . . . , MCn), wherein, the plurality of accelerator cards (MC1, MC2, . . . , MCi, . . . , MCn) are communicatively connected to the plurality of PCIE switches (P1, P2, . . . , Pi, . . . , Pm) to process data from the plurality of PCIE switches (P1, P2, . . . , Pi, . . . , Pm).

Article 5. The system of any of Articles 1-4, wherein, a count m of the plurality of PCIE switches (P1, P2, . . . , Pi, . . . , Pm) is equal to a count n of the plurality of accelerator cards (MC1, MC2, . . . , MCi, . . . , MCn), so that each of the PCIE switches is communicatively connected to an accelerator card.

Article 6. The system of any of Articles 1-5, wherein, the count m of the plurality of PCIE switches (P1, P2, . . . , Pi, . . . , Pm) is less than the count n of the plurality of accelerator cards (MC1, MC2, . . . , MCi, . . . , MCn), so that at least one of the plurality of PCIE switches (P1, P2, . . . , Pi, . . . , Pm) is communicatively connected to at least two of the accelerator cards (MC1, MC2, . . . , MCi, . . . , MCn).

Article 7. The system of any of Articles 1-6, wherein, the plurality of PCIE switches (P1, P2, . . . , Pi, . . . , Pm) are connected so that each of the PCIE switches shares an accelerator card connected to itself with the other PCIE switches.

Article 8. The system of any of Articles 1-7, wherein, the plurality of PCIE switches are connected in cascade.

Article 9. The system of any of Articles 1-8, wherein, the plurality of PCIE switches are connected in pairs.

Article 10. The system of any of Articles 1-9, wherein, the plurality of PCIE switches are connected in a tree topology manner.

Article 11. The system of any of Articles 1-10, wherein, the plurality of PCIE switches are connected in a double-tree topology manner.

Article 12. The system of any of Articles 1-11, wherein, the plurality of PCIE switches are connected in a fat-tree topology manner.

Article 13. The system of any of Articles 1-12, further comprising a management unit (300) configured to manage the data exchange unit (100) and/or the accelerated processing unit (200).

Article 14. The system of any of Articles 1-13, wherein, the management unit (300) is a baseboard management controller BMC.

Article 15. The system of any of Articles 1-14, further comprising an interface unit (400) configured to be connected to the management unit (300) so as to facilitate the management of the data exchange unit (100) and/or the accelerated processing unit (200) by the management unit (300).

Article 16. The system of any of Articles 1-15, further comprising:
a sensing apparatus, which is connected to the management unit (300) to interact with the management unit (300) for sensing information,
a storage apparatus, which is connected to the management unit (300) to facilitate data access by the management unit (300), and/or
a temperature control apparatus, which is connected to the management unit (300) to facilitate temperature regulation of the system by the management unit (300).

Article 17. A board card comprising the system of any of Articles 1-16.

Article 18. An electronic device comprising the system of any of Articles 1-16 or the board card of Article 17.

Article 19. The electronic device of Article 18, wherein, the electronic device is a server.

In the above-mentioned embodiments of the present disclosure, the description of each embodiment has its own emphasis. For a part that is not described in detail in one embodiment, see the related description in another embodiment. The technical features of the embodiments above can be randomly combined. For conciseness, not all possible combinations of the technical features of the embodiments are described. Yet, provided that there is no contradiction, those combinations shall all be considered as being within the scope of the description of the present specification.

The invention claimed is:

1. A system for data accelerated processing, comprising: a data exchange unit and an accelerated processing unit, wherein,
the data exchange unit is configured to be communicatively connected to an external host, wherein the data exchange unit includes a plurality of data switches, each of which is configured to be communicatively connected to the external host; and
the accelerated processing unit is configured to be communicatively connected to the data exchange unit to process data from the data exchange unit, wherein computational resources of the accelerated processing unit are configured to be scheduled to meet requirements indicated by the external host,
wherein the accelerated processing unit includes a plurality of accelerator cards, wherein the plurality of accelerator cards are communicatively connected to the plurality of data switches to process data from the plurality of data switches.

2. The system of claim 1, wherein, a count m of the plurality of data switches is equal to a count n of the plurality of accelerator cards, so that each of the data switches is communicatively connected to an accelerator card.

3. The system of claim 1, wherein, a count m of the plurality of data switches is less than a count n of the plurality of accelerator cards, so that at least one of the plurality of data switches is communicatively connected to at least two of the accelerator cards.

4. The system of claim 1, wherein, the plurality of data switches are connected so that each of the data switches shares an accelerator card connected to itself with the other data switches.

5. The system of claim 4, wherein, the plurality of data switches are connected in cascade.

6. The system of claim 4, wherein, the plurality of data switches are connected in pairs.

7. The system of claim 4, wherein, the plurality of data switches are connected in a tree topology manner.

8. The system of claim 4, wherein, the plurality of data switches are connected in a double-tree topology manner.

9. The system of claim 4, wherein, the plurality of data switches are connected in a fat-tree topology manner.

10. The system of claim 1, further comprising a management unit configured to manage the data exchange unit or the accelerated processing unit.

11. The system of claim 10, wherein, the management unit is a baseboard management controller BMC.

12. The system of claim 10, further comprising an interface unit configured to be connected to the management unit so as to facilitate the management of the data exchange unit and/or the accelerated processing unit by the management unit.

13. The system of claim 10, further comprising:
a sensing apparatus, which is connected to the management unit to interact with the management unit for sensing information.

14. The system of claim 10, further comprising a storage apparatus connected to the management unit to facilitate data access by the management unit.

15. The system of claim 10, further comprising a temperature control apparatus connected to the management unit to facilitate temperature regulation of the system by the management unit.

* * * * *